Oct. 3, 1961   A. H. JOBERT   3,002,257
CHUCK-ACTUATING MECHANISM
Filed June 4, 1954   2 Sheets-Sheet 1

INVENTOR
ARTHUR H. JOBERT
BY
Mitchell & Bechert
ATTORNEYS

INVENTOR
ARTHUR H. JOBERT
BY
Mitchell & Bechert
ATTORNEYS

United States Patent Office 3,002,257
Patented Oct. 3, 1961

3,002,257
CHUCK-ACTUATING MECHANISM
Arthur H. Jobert, New Britain, Conn., assignor to The New Britain Machine Company, New Britain, Conn., a corporation of Connecticut
Filed June 4, 1954, Ser. No. 434,524
13 Claims. (Cl. 29—37)

My invention relates to chucking means for an automatic multiple-spindle machine.

It is an object of the invention to provide improved means of the character indicated.

It is another object to provide improved chucking means inherently adaptable to the uniform chucking of stock, without requiring close tolerance in the diameter of the stock.

It is a further object to provide an improved chucking mechanism successively operable at each of a plurality of index stations in a multiple-spindle machine, and having provision not only for independent manual actuation of the chuck at any particular station but also for automatic assurance that the machine will not be run with the chuck open.

It is a specific object to meet the above objects with a construction employing so-called Belleville springs as the loading means for the chuck at each spindle location.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
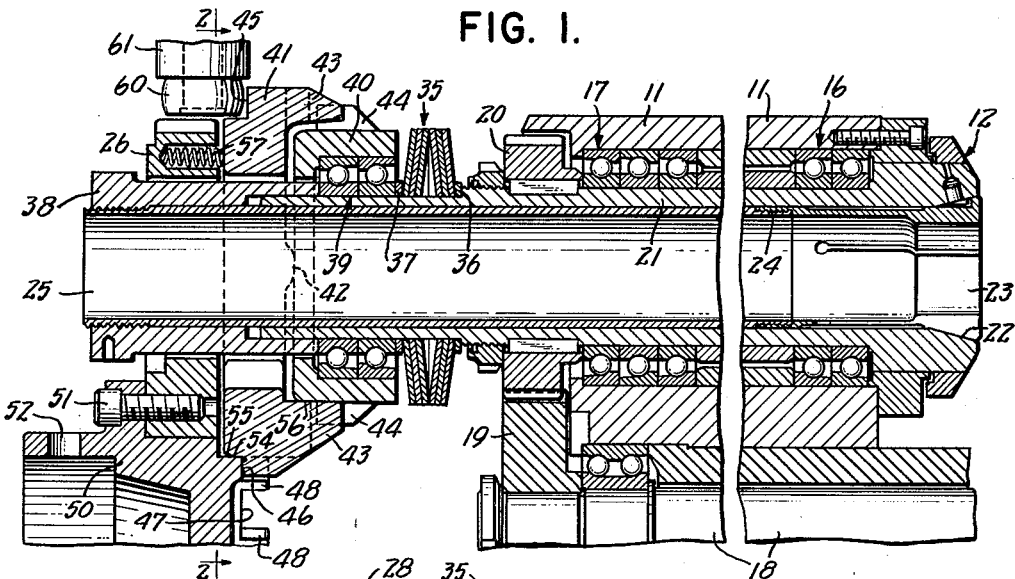
FIG. 1 is a fragmentary longitudinal sectional view of a spindle in a spindle carrier and incorporating features of the invention.

Briefly stated, my invention contemplates an improved chucking mechanism for a multiple-spindle machine of the type in which separate chucks or collets carried by the respective revoluble spindles on an indexible spindle carrier are to be selectively actuated at one or more loading stations. By employment of so-called Belleville-spring washers to load the individual chucks or collets for each spindle, I provide axial compactness and at the same time may assure substantially the same chucking grip on the stock, regardless of fluctuating stock diameters. For each spindle, I provide a simplified spring-relieving and therefore chuck-actuating mechanism, involving a yoke fulcrumed centrally of the spindle carrier and having an externally accessible actuating surface to be engaged by a frame-based actuating mechanism. The actuating mechanism carried by the frame may include conventional parts operating in timed relation with the indexing cycle of the machine. As a further feature of the invention, I provide novel manual means for actuating a chuck at a given index station, independently of the automatic mechanism, but with the provision of a safety feature which will automatically reset or close the chuck that has been manually opened, the resetting being accomplished as soon as the machine is again started in automatic operation.

Referring to the drawings, my invention is shown in application to an automatic multiple-spindle machine comprising frame means 10 supporting a spindle carrier 11 for rotation about an indexing axis. The spindle carrier may support a plurality of spindles 12—13—14—15 in spaced pre-loaded bearings, as at 16—17, for continuous rotation; in the form shown, drive to the respective spindles is accomplished by means of a shaft 18 concentric with the indexing axis and carrying at its inner end a drive gear 19 meshing simultaneously with drive gears, as at 20, for the respective spindles. The principal part of the spindle may comprise a spindle tube 21 having at the nose end an outwardly flared conical surface 22 for cooperation with the jaws of a collet or chuck 23. The collet 23 may be of the hollow internally fed variety and is shown threaded at 24 to a collet tube 25 extending out the rear end of the spindle carrier and longitudinally slidable with respect to the spindle tube 21.

The rear end of the spindle carrier may be defined by the index-drive gear 26, rigidly attached to the main body of the spindle carrier by bolt means 27 and spacers 28, the spacers being located between spindle positions and affording considerable open area for provision of and access to chuck-actuation means to be described. The indexing of the spindle carrier may be accomplished by means operating in timed relation with the main camshaft 30. For this purpose, a Geneva arm 31 on shaft 30 may drive a Geneva wheel 32, and a suitably proportioned intermediate or idler gear 33 may connect the Geneva wheel 32 to the index gear 26.

In accordance with the invention, the collet or chucking means 23 is continuously preloaded by spring means, which operate preferably in a direction to close the jaws, or rather to set the chuck. This means, for the case depicted in FIG. 1, that the spring means 35 shall urge the tube 25 to the left with respect to the spindle tube 21. The spring means 35 is preferably a suitable combination of Belleville-spring washers, comprising opposed, strongly resilient, frusto-conical discs; in the form shown, two groups of three washers oppose each other, and this arrangement will be understood as representing a particular desired relation of collet-loading and axial actuation. The washers 35 may ride a slightly reduced diameter of the spindle tube 21, between thrust-abutment washers 36—37, and an externally accessible take-up nut 38 provides the means for adjusting the setting of the spring 35.

With a preloaded chuck of the character described, chuck actuation is achieved upon deflecting the spring 35. For this purpose, I have provided tandem anti-friction thrust bearings 39, the inner members of which are slidably mounted on the spindle 21 and are located between the take-up nut 38 and the abutment washer 37; the bore of a cup-shaped thrust ring 40 receives both outer bearing rings. Finally, a thrust yoke 41 loosely embraces the spindle and includes diametrically opposed axial projections 42, which are preferably crowned slightly to rock on diametrically opposed locations on the thrust ring 40. The projections 42 are preferably equally spaced radially with respect to the indexing axis. Cooperating lugs at 43 on the yoke 41 and at 44 on the thrust ring 40 assure that movement of the thrust ring 40 is limited to purely axial displacement.

The yoke 41 is actuated by applying axially directed actuating force at an outer exposed surface 45 and by reacting this force against a fulcrum, as formed by engagement of an inwardly facing lug 46 (on yoke 41) with a radial flat on the spindle carrier. This flat may be one of a plurality, as at 47, defined between spaced locating lugs 48 on a bushing member 50 secured, as by bolts 51, at the bore of the index gear 26 and, therefore, effectively forming part of the spindle carrier. The bushing 50 may be formed at its other end with suitable means 52 to engage and drive a suitable stock reel as is well known in the art.

The yoke 41 will, of course, be locked against rotation with the spindle by reason of the fulcrum-and-lug engagement 46—48. Positive radial location of the yoke is assured by having an inner shoulder 55 ride a flat 54 on the bushing 50 and by having one of the inner lugs 43 on the yoke 41 ride the periphery of the thrust ring 40, as at 56. Spring means 57 carried between index gear 26 and yoke 41 may continuously urge the yoke 41 against the thrust ring 40, so as to avoid any looseness when the parts are not being actuated. Because the actuation of the chuck is accompanied by a rocking action of the yoke 41, I prefer that the fulcrum 46 (at the location of its engagement with the bushing 50), and that the projection 42 (at the location of its engagement with the ring 40) shall both be crowned surfaces, thereby minimizing stress concentrations and the wearing of parts.

Figure 2:
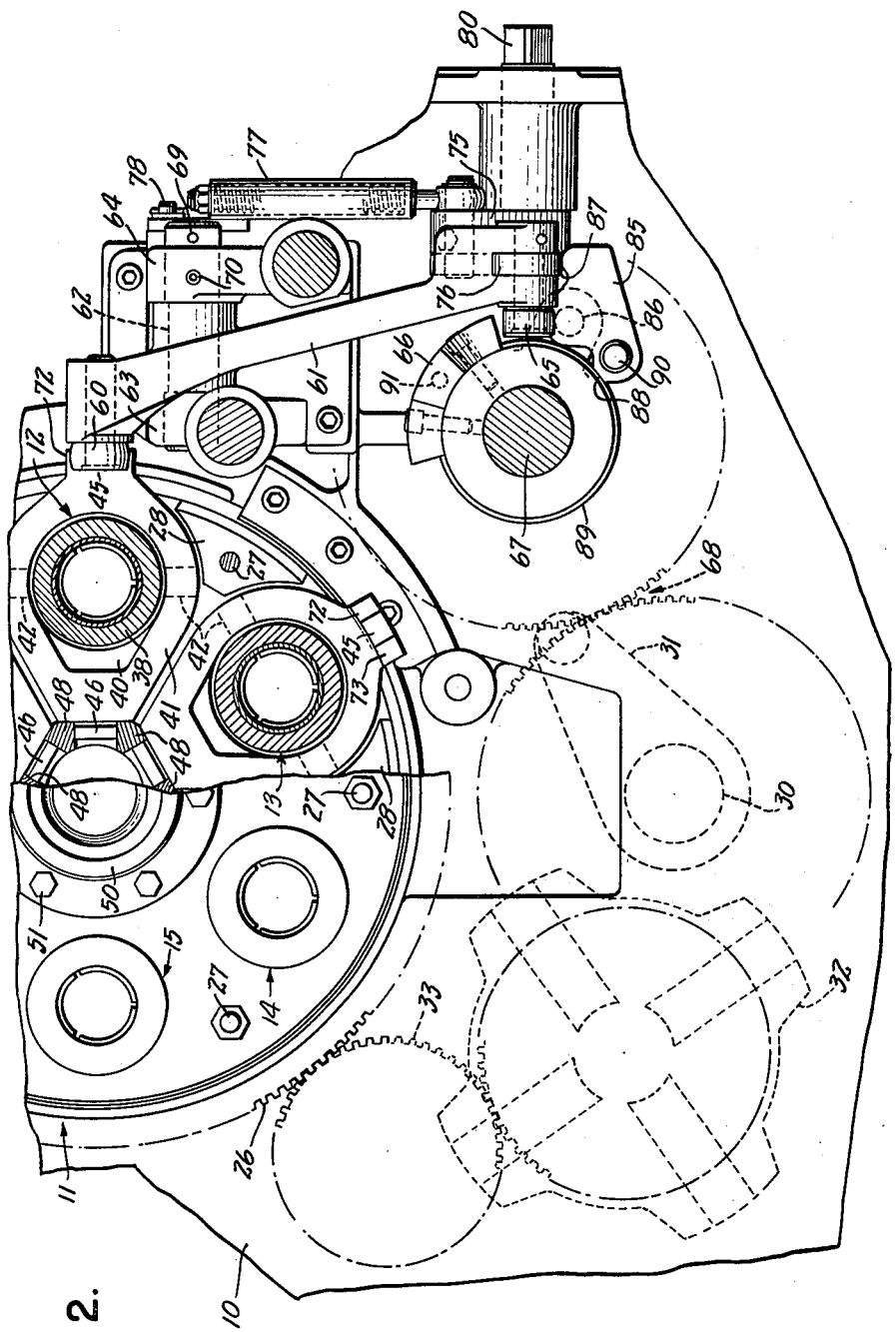
FIG. 2 is a left-end view of the spindle carrier of FIG. 1, with certain parts broken away in substantially the plane 2—2 of FIG. 1.

The actuating surfaces 45 for the respective chucks or collets of various spindles are preferably located in a common radial plane about the indexing axis. This assures that an actuating member, such as the roll 60, carried at one end of an actuating lever 61, may always find a surface 45 in the correct radial plane, regardless of the index position of the spindle carrier. The lever 61 may be pivoted in the frame 10, as on a pivot shaft 62 between spaced frame members 63—64, and basic automatic actuating movement of lever 61 may be derived by a roll 65 following a program cam 66 on a shaft 67, driven at 68 (FIG. 2) in one-to-one relation with the main camshaft 30.

To provide for small adjustment in the longitudinal positioning of the actuating roll 60, I show adjustable means for positioning the pivot 62 for lever 61. This adjustment is accomplised by having the frame-journalled parts of pivot 62 eccentrically formed with respect to that part of pivot 62 which directly supports the lever 61. Spanner holes 69 provide external access for eccentric adjustment, and set-screw means 70 (FIG. 2) may secure an eccentric adjustment. The adjustment of eccentric pin 62 is preferably such that, with lever 61 in the unactuated position shown in FIG. 3, a small axial clearance 71 exists between roll 60 and flat 45.

In operation, the machine will function automatically to unchuck a given spindle, as at 12, when that spindle is indexed into the loading station. Unchucking is accomplished by the action of cam 66 on the follower roll 65 to temporarily relieve the force of spring 35 on the collet or chuck parts. When the cam 66 allows lever 61 to retract, spring 35 again becomes effective to close the chuck jaws, and the rest of the machine cycle can proceed. This cycle will be accompanied by an indexing of the spindle carrier involving the placement of another yoke 41 (for the next-indexed spindle) in alignment with the actuating roll 60. Ordinarily, as indicated, I prefer the small axial clearance 71 between these parts so that there is no interference with indexing. However, to provide further assurance against fouling as a new yoke 41 is brought into alignment with the roll 60, I show my preference for forming the lateral sides of the actuating surface or flat 45 with cam slopes 72—73, as will be understood.

Figure 3:
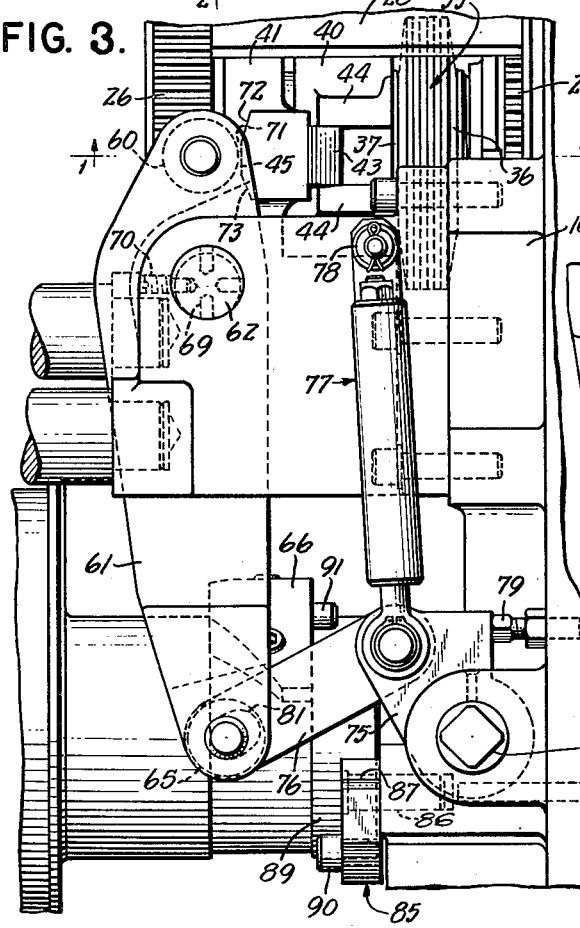
FIG. 3 is a view in elevation of certain actuating parts for the chuck in the spindle of FIG. 1, the view being taken as a right-end elevation of the assembly of FIG. 2.
Figure 4:
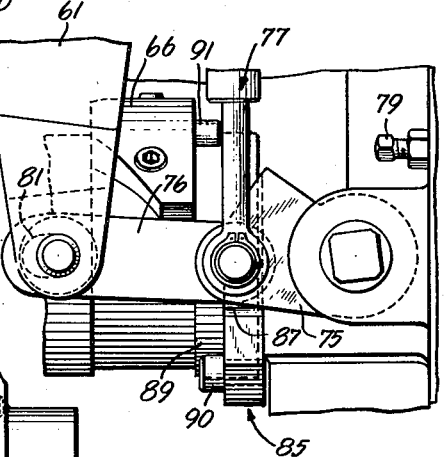
FIG. 4 is a fragmentary view similar to FIG. 3 but showing certain of the parts in another position.

In accordance with a further feature of the invention, I provide novel manually operated actuating means for operating a spindle chuck or collet, as when the machine is not functioning automatically, or when a set-up adjustment is being made. This mechanism may employ toggle elements including a crank 75 connected by a link 76 to the lower end of the lever 61. Spring means 77 may be anchored at 78 to the frame and serve to hold the toggle in or urge the toggle into the broken position, as shown in FIG. 3. For this position, the lever 61 will be held fully retracted, as determined by an abutment adjustment 79, functioning to limit the toggle arm 75. Manual operation may be performed by fitting a suitable wrench or crank to the squared end 80 of the shaft for toggle crank 75, and, when actuated, the parts will appear as shown in FIG. 4. It will be understood that the force acting on lever 61 by virtue of spring 35 may be such as positively to hold the locked-toggle position of FIG. 4, even against the braking action of spring means 77. Of course, this locked or set position may be manually relieved when the operator has determined no longer to keep the chuck in open position, and the spring 77 will then properly hold the parts in the relation shown in FIG. 3. Slotted or lost-motion means 81 in the connection of link 76 to lever 61 may assure complete freedom for automatic operation of lever 61 without risking an inadvertent locking of the toggle; thus, the only way to set or lock the toggle is by way of the manually operated means 80.

In accordance with another feature of the invention, I provide automatic means functioning in timed relation with the indexing cycle to release the toggle and, therefore, to close the chuck or collet 23 when the machine is started for automatic operation. Of course, ordinarily this automatic means will not be called into play because an operator usually remembers to reset the chuck after he has manually opened it. However, should the operator inadvertently fail to close the chuck by the manual means 80, my automatic mechanism will function. In the form shown, the automatic toggle release involves actuation of a rocker 85 pivoted to the frame, as at 86, and having a driving end 87 in alignment with a central portion of the toggle parts 75—76 when in the set position shown in FIG. 4. The other end 88 of the rocker 85 may normally ride a cylindrical surface 89 forming part of or carried by the shaft 67 for cam 66, and means carried by this shaft may be effective to actuate the rocker 85. In the form shown, a pin 90 on the rocker 85 is poised to intercept another pin 91 on the cam 66, and the angular proximity between action of cam 66 on roll 65, with respect to pin 91 on pin 90, is preferably such that the safety-release rocker 85 is actuated virtually immediately upon starting the machine or cam-shaft 67 from the chuck-open position thereof.

It will be seen that I have described improved chucking or collet means for a multiple-spindle machine. The use of Belleville springs permits axial compactness and at the same time provides uniform stock-grip action for a relatively wide fluctuation of stock diameter. Chuck-actuation is achieved by simple mechanism whether on an automatic or on a selectively manual basis. The arrangement is such that all parts requiring adjusting, as for accommodating various stock diameters and chuck loadings, may be accomplished with ease. In fact, access to remove the chuck-loading parts themselves is extremely easy upon releasing the bolts 27, which anchor the index gear 26 to the spindle carrier. The manual-actuating means and the automatic release for that mechanism are also provided with relatively simple adjustment means, and there is provision that when the machine is started in automatic operation, all spindles will be chucked.

While I have described the invention in detail for the preferred form shown, it will be understood that modifications may be made within the scope of the invention as defined in the claims which follow.

I claim:

1. In a machine of the character indicated, a spindle carrier mounted for indexing about an indexing axis, a plurality of spindles revolubly carried by said spindle carrier at spaced locations on a circle of spindle centers about said indexing axis, said spindle carrier having central solid-abutment means for chucking-reaction forces, said abutment means being radially inside the circle of spindle centers, chucking means carried by each of said spindles and actuable between chucking and unchucking positions; each said chucking means for its associated spindle including opposed frusto-conical spring washers loading said chucking means for actuation to chucking position, thrust-bearing means carried by said associated spindle and axially shiftable along said spindle to relieve said spring washers, a thrust yoke embracing said spindle and in axial thrust-imparting relation with said bearing means, an inwardly directed fulcrum carried by said yoke and reacting against said fixed central solid abutment part of said spindle carrier, and an actuating surface on said yoke located on the opposite side of said spindle from said fulcrum; the actuating surface for all yokes being in substantially a common radial plane of said indexing axis.

2. A machine according to claim 1, and including key means non-rotatably relating said yoke with a part of said thrust bearing.

3. In a machine of the character indicated, a spindle carrier indexible about an indexing axis, a plurality of spindles revolubly carried by said carrier at spaced locations about said axis, chucking means carried by each spindle and actuable between chucking and unchucking positions thereof, a chuck-closing spring for each chucking means and continuously urging the same to chucked position, an indexing gear carried at the rear of said spindle carrier, means centrally carried by said gear and including a plurality of lugs extending axially and determining therebetween a plurality of angularly spaced fulcrum abutments corresponding in number to the number of spindles, a separate chuck-actuating yoke separately embracing each spindle and actuable to relieve said spring and including a radially inwardly directed fulcrum lug fitting and directly abutting one of said fulcrum bearings, said yoke having a radially extending outer actuating surface for receiving longitudinally directed actuating displacement by an external actuating member, said actuating surface for all yokes being in substantially the same radial plane about said axis.

4. In a machine of the character indicated, a spindle carrier indexible about an indexing axis, a plurality of spindles revolubly carried by said spindle carrier at angularly spaced locations, chucking means carried by each spindle and actuable between open and closed positions, spring means comprising for each spindle a plurality of opposed frusto-conical washers loading the chucking means for that spindle for actuation to the chucking position, thrust-bearing means slidably carried by said spindle for selectively relieving said spring means and for thus opening the chucking means, said thrust-bearing means comprising spaced raceway elements with antifriction elements therebetween, one of said raceway elements being in direct thrusting relation with said spring, a separate thrust yoke carried by said spindle carrier for each said chucking means and separately embracing each said spindle and having diametrically opposed axial projections in thrusting relation with said other raceway element for each said spindle, said projections being at substantially the same radius about the indexing axis, a radially inwardly located fulcrum on each said yoke and riding a central part of said spindle carrier, and a radially outwardly projecting actuating surface on said yoke, said latter surfaces for all yokes being in substantially the same radial plane about the indexing axis.

5. In a machine of the character indicated, a spindle carrier indexible about an indexing axis, a plurality of spindles revolubly carried at spaced locations on said spindle carrier, collet means carried by each spindle and including a rearwardly extending actuating tube, opposed frusto-conical spring washers intermediate the front of said spindle and the rear of said tube and loading said collet means via said tube and in the direction to set said collet means in a stock-gripping position, means including a thrust bearing slidably carried by said spindle to relieve said spring washers, and a separate yoke embracing each said spindle and having thrust projections aligned with part of said bearing at substantially diametrically opposed locations with respect to the spindle axis and substantially equally radially spaced with respect to the indexing axis, separate radially inward fulcrum means on each said yoke, said spindle carrier including central fulcrum abutment means for the fulcrum means of all said yokes, and an exposed externally accessible actuating surface on said yoke at a radially outward location with respect to the indexing axis and with respect to the particular spindle axis, the actuating surfaces of all yokes being in substantially the same radial plane.

6. In combination, a frame, a spindle carrier journaled in said frame for indexing about an indexing axis, a plurality of spindles revolubly carried by said spindle carrier, chucking means carried by each spindle and including for each spindle a spring loading the chucking means to closed position, and chuck-actuating means including an externally accessible actuating surface for each spindle, said actuating surfaces being in substantially a common radial plane about the indexing axis, framemounted chuck-actuating means at one of the index positions of said spindle carrier and comprising a lever pivoted on said frame and carrying means to engage successive of said actuating surfaces as said spindle is indexed to said successive stations, cam means directly actuating said lever and operating in timed relation with an indexing of said spindle carrier, and manual chuck-opening means including a toggle mechanism for actuating said lever.

7. The combination of claim 6, in which said toggle mechanism includes a spring biasing said toggle mechanism for retention of that toggle position which corresponds to the unchucked position of said chucking means.

8. In combination, a frame, a spindle carrier mounted on said frame for indexing about said axis, a plurality of spindles revolubly carried by said spindle carrier at spaced locations, chucking means for each spindle and including spring means biasing said chucking means in chuck-closing direction, means including an externally accessible actuating surface for relieving the spring means of each spindle chuck, said actuating surfaces being in substantially a common plane about the axis of said spindle carrier, an actuating lever pivotally mounted on said frame and including a part in longitudinal alignment with one of said surfaces for each indexed position of said spindle carrier, manual means including a toggle mechanism for actuating said lever, said toggle mechanism having a set position in which one of said spring means is relieved and having a broken position in which said one spring means is enabled to bias said chucking means, and means operating in timed relation with an indexing of said spindle carrier for actuating said lever independently of said manual means.

9. The combination of claim 8, and including means for adjusting the pivot position for said lever.

10. The combination of claim 8, in which automatic toggle-release means is operative in timed relation with an indexing of said spindle carrier; whereby, upon starting the machine for automatic operation following manual setting of said toggle, said toggle may be automatically released so as to prevent operation of the machine with chucking means in open position.

11. A machine tool spindle, including a revolubly mounted chuck and actuating means therefor, said actuating means including compressed spring means preloading said chuck in the direction to grip a piece of stock, thrust-bearing means on the axis of said spindle and on one longitudinal side of said spring means, diametrically opposed abutments on said thrust-bearing means, a fixed abutment for said thrust-bearing means on the other longitudinal side thereof, actuating means external to said spindle and including a yoke pivotally applicable to relieve the load on said spring means by axial abutment with said thrust-bearing means, a fixed reference fulcrum for one side of said yoke, diametrically opposed abutments on said yoke and engaging the diametrically opposed abutments on said thrust-bearing means to prevent relative rotation between said thrust-bearing means and said yoke, whereby limited rocking motion is permitted for said yoke relative to said spindle while securing said yoke and thrust-bearing means against relative rotation, an actuating projection on the other side of said yoke, and actuating means external to said spindle and including a thrust applicator positioned for longitudinal alignment with said projection, whereby said chuck may be actuated to open position by actuation of said applicator in the direction to relieve said spring means and thereby permit said chuck to open.

12. In a machine of the character indicated, a frame, a spindle carrier indexible about an indexing axis in said frame, a plurality of spindles revolubly carried at spaced locations on said spindle carrier, collet means carried by each spindle and including a rearwardly extending actuating tube, opposed frusto-conical spring washers intermediate the front of said spindle and the rear of said tube and loading said collet means via said tube and in the direction to set said collet means in a stock-gripping position, means including a thrust bearing slidably carried by said spindle to relieve said spring washers, a separate thrust yoke embracing each spindle and having thrust projections aligned with part of said bearing at substantially diametrically opposed locations with respect to the spindle axis and substantially equally radially spaced with respect to the indexing axis, separate radially inward fulcrum means on each said yoke, said spindle carrier including central fulcrum abutment means for the fulcrum means of all said yokes, an exposed externally accessible actuating surface on each said yoke at a radially outward location with respect to the indexing axis and with respect to the particular spindle axis, whereby for fluctuations in stock size from stock in one collet to stock in another collet the yoke actuating surfaces of different spindle collets will assume different positions that are variously axially displaced from a radial plane about the index axis, and a frame-based force-multiplying linkage mounted at one of the index positions of said spindle carrier and comprising a lever pivoted on said frame and including actuator means to engage successive of said actuating surfaces as said spindle is indexed to successive stations, said actuator means and each of said actuating surfaces having cooperating cam and cam-follower means engageable as each particular spindle is indexed into the chucking station, said cam and cam-follower means being oriented for axial action, whereby said cam and cam-follower means may engage for a variety of stock sizes within such size fluctuations, and further whereby the limited axial displacement available for chuck opening by reason of a large force-multiplying factor in said linkage may not be adverse to the accomplishment of effective collet opening for any such stock-size fluctuations.

13. A machine according to claim 12, in which there is but one thrust yoke embracing each spindle, and in which said frame-based force-multiplying linkage acts directly on said yoke with reaction via said frame.

References Cited in the file of this patent
UNITED STATES PATENTS

| | | |
|---|---|---|
| 210,165 | Stockwell | Nov. 19, 1878 |
| 463,626 | Hastings | Nov. 24, 1891 |
| 1,481,245 | Klausmeyer | Jan. 15, 1924 |
| 1,650,374 | Mero | Nov. 22, 1927 |
| 2,033,490 | Simpson | Mar. 10, 1936 |
| 2,252,840 | Drissner | Aug. 19, 1941 |
| 2,348,085 | Merolle | May 2, 1944 |
| 2,369,330 | Wilson | Feb. 13, 1945 |
| 2,386,960 | Jellinek | Oct. 16, 1945 |
| 2,448,393 | Reynolds | Aug. 31, 1948 |